April 13, 1943.   D. GREGG   2,316,416
PRESSURE AND FLOW REGULATOR
Filed Dec. 31, 1940
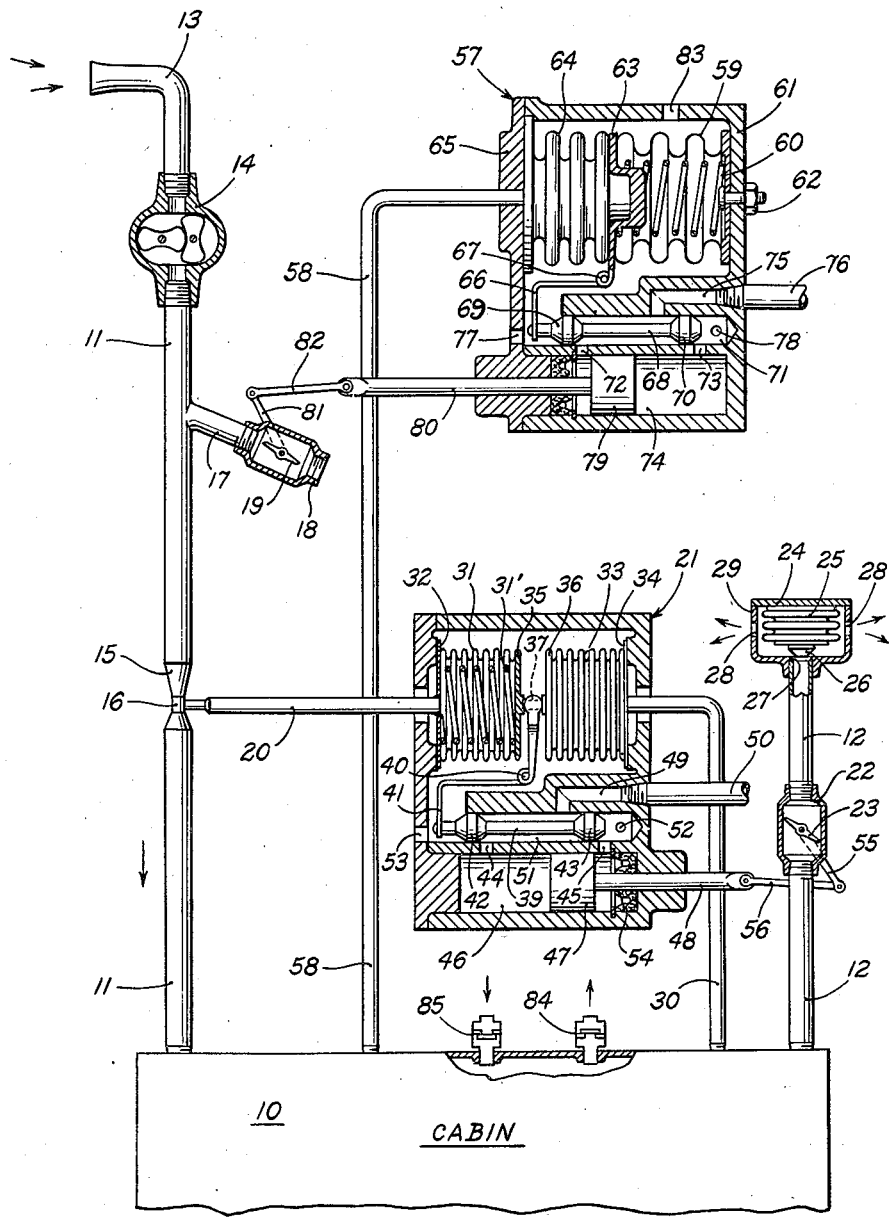
INVENTOR.
David Gregg
BY David F. Goody
ATTORNEY.

Patented Apr. 13, 1943

2,316,416

UNITED STATES PATENT OFFICE 2,316,416

PRESSURE AND FLOW REGULATOR

David Gregg, Caldwell, N. J., assignor to Bendix Aviation Corporation, South Bend, Ind., a corporation of Delaware Application December 31, 1940, Serial No. 372,692

4 Claims. (Cl. 128—204)

This invention relates to air control systems, and principally, to a means for maintaining aircraft cabin air at a pressure and quality comfortable to crew and passengers.

The air lines have established scheduled operation in altitudes in excess of 18,000 feet, and several systems have been devised for controlling the interior pressure of the cabin and the amount of air per person per unit of time so that the crew and passengers will suffer no ill effects incidental to the low atmospheric pressures of high altitudes. The present invention relates to an improved pressure and air flow control system that obviates many disadvantages inherent in the prior art systems.

It is an object of the present invention to provide a system for regulating the cabin pressure of aircraft, and also to automatically maintain the rate of flow of air through the cabin within definite limits.

Other objects of the invention include, the provision of a means for limiting the maximum rate of flow of air through a cabin, and for regulating the rate of flow of air into and from the cabin in accordance with predetermined pressure requirements within the cabin.

Other objects of the invention will become apparent from a study of the specification when considered together with the attached drawing, wherein a single figure shows a schematic diagram of one embodiment of the system of the present invention.

A cabin 10 of conventional passenger type, and preferably one that has been sealed for high altitude flying, has an air intake conduit 11 attached to one end thereof, and an air exhaust conduit 12 attached to the other (preferably the trailing) end of cabin 10. Air is scooped into intake 11 by means of a ram 13, or other suitable tubular member having its open end located in a forward portion of a wing or the fuselage.

When scooped into ram 13, air is led through a supercharger or compressor pump 14, which may be of the "Roots" type, as shown, or of any other desired type. After passing through supercharger 14, the intake air will be at an increased pressure and is forced to flow through a Venturi tube 15 having a low pressure throat 16. Between venturi 15 and compressor 14 there is located a by-pass conduit 17, to which is attached a housing 18 of a conventional type containing a valve or throttle member 19. A tubular member 20 is connected with one open end at the throat 16 of venturi 15 and its other open end passing through the housing of pressure regulator 21.

Exhaust conduit 12 has attached, intermediate its end, a housing 22, in which is mounted a conventional valve or throttle member 23. Another valve member 24 is located at the outer end of conduit 12 and includes an aneroid member 25 having a valve head 26 carried at its lower end for cooperation with a valve seat 27 in the outer end of exhaust conduit 12. A plurality of ports 28 is positioned about the wall of the valve housing 29, for the expulsion of air from exhaust conduit 12 to the outer atmosphere.

Communication of regulator 21 with cabin 10 is provided by tubular member 30. Regulator 21 includes a flexible metallic bellows or sylphon chamber 31 to which is connected the open end of tube 20 through an aperture in end wall 32. A coiled spring 31', for a purpose to be described later, is contained within chamber 31. A second bellows or sylphon chamber 33 is connected to tubular member 30 through an aperture in end wall 34, and the bellows 31 and 33 are sealed against the admission of exterior pressures, except through the tubular members 20 and 30, respectively. Movement of end walls or partitions 35 and 36, which are connected together by a link member 37, will result only when there is a change in the pressure at throat 16 or in cabin 10 from an established neutral relation of pressures therein. Link 37 carries a rigid arm which is connected to a valve rod 39 through a pivot 40 and bracket member 41 which has one end secured to valve rod 39.

Valve rod 39 carries spaced valve members 42 and 43, which are movable with respect to ports 44 and 45, which communicate with a cylinder 46 containing a piston 47 and a connecting rod 48. Oil or other suitable fluid is introduced into a passage 49 under pressure through conduit 50 from a source, not shown, which may be an engine driven oil pump. When valves 42 and 43 are to the right of the position shown so that they cover ports 44 and 45, respectively, oil under pressure entering passage 49 and valve chamber 51 is incapable of causing motion of piston 47, but in the position shown, oil is allowed to flow under pressure through port 44, causing piston 47 to travel toward the right end of cylinder 46, as shown, and oil will be forced to leave cylinder 46 through port 45, which returns it, by means of a suitable conduit, to a sump, not shown, through a discharge port 52. Alternatively, if valves 42 and 43 are moved to the right of ports 44 and 45, respectively, oil under pressure will flow into cylinder 46 through port 45 forcing piston 47 to travel to the left hand end of cylinder 46 and oil will then be expelled through port 44 and return to the sump, not shown, through a discharge port 53. In order to prevent the loss of oil under pressure from cylinder 46, a suitable packing gland 54 may be provided.

Movement of connecting rod 48 causes rotation of throttle 23, which is controlled by connecting rod 48 through a valve arm 55 and a loose link 56.

Another regulator 57, somewhat similar to regulator 21, is shown having a pressure connection to cabin 10 through tubular conduit 58. A flexible bellows or sylphon chamber 59 sealed at a vacuum, but enclosing a coil spring 60, is attached to end wall 61 by means of a nut and bolt 62. This bellows has an end wall or partition 63 to which there is attached a second flexible bellows or sylphon forming a chamber 64 having one end connected to end wall 65 and open to communication with cabin 10 by means of the connection of conduit 58 thereto. End wall or partition 63 carries a bracket 66 connected thereto by means of a pivot 67 and the end of the bracket is rigidly connected to the end of valve rod 68.

Valve rod 68 carries spaced valve members 69 and 70 in a valve chamber 71 and valves 69 and 70 are intended for cooperation with ports 72 and 73 opening from chamber 71 to cylinder 74. In the same manner as explained above, oil under pressure is introduced into passage 75 through a conduit 76 from an oil pump, not shown, and upon motion of valves 69 and 70 to the right and to the left, as described above, oil will be returned through one or the other of discharge ports 77 and 78. A piston 79 is slidable in cylinder 74 and carries piston rod 80, which is operatively connected to valve 19 through a valve arm 81, and a loose link 82. Atmospheric pressure is admitted through a port 83 to the space within regulator 57, surrounding flexible chambers 59 and 64.

A safety valve 84 may be mounted in the wall of cabin 10 to vent cabin pressures to the external air when, for any reason, the internal pressure might exceed a safe pressure limit and impose undue stress on the aircraft structure. Another valve 85 may be mounted in the wall of cabin 10 for allowing external atmospheric air to enter cabin 10 when the external pressure exceeds the desired cabin pressure. For example if the cabin is to be charged to a pressure equivalent to an altitude of 10,000 feet, then as the craft descends below 10,000 feet, valve 85 acts to gradually equalize external and internal pressures, so that upon the craft's landing, cabin and atmospheric pressure will be equal and the passengers will not be subjected to a quick change of pressure when the cabin is opened.

The operation of the system above set forth will now be explained. A fixed pressure for cabin 10 may be decided upon, and while it may represent any external pressure from sea level to about 10,000 feet, for simplicity we may assume that it is desired to maintain the cabin at 15 lbs. per square inch. The relation between chambers 59 and 64 will, therefore, be such that at 15 lbs., coil spring 60 will extend partition 63 so that valves 69 and 70 may rest directly above ports 72 and 73, respectively, and we may term this the neutral or normal condition for regulator 57. Under this condition of pressure, the pressure within chamber 64 will be 15 lbs., neglecting any pressure change due to friction, etc., in conduit 58.

Since, for the comfort of the passengers, it is necessary, not only to maintain a certain pressure within cabin 10, but also to change the air within the cabin at a definite rate, supercharger 14 must provide a definite volume of air, and exhaust conduit 12 must discharge the same volume of air in a unit of time, assuming that the cabin suffers no leakage. For convenience, let us assume that cabin 10 must be kept at a pressure of 15 lbs., and that the rate of flow of air from the cabin must be 80 cu. ft. per min. per passenger. Valve 24 will be set, therefore, so that for any external atmospheric pressure contemplated in the use of this system, the aneroid member 25 will respond to the variable atmospheric pressures to maintain valve 26 separated from valve seat 27, so that a maximum of 80 cu. ft. of air per minute per passenger may be discharged through ports 28.

The principal function of regulator 57 is to maintain a constant pressure in the output of supercharger 14 and in cabin 10 over the working range for which it is adapted to use, and supercharger 14 will be designed to have sufficient capacity to maintain the desired pressure in conduit 11 over a wide range of external atmospheric pressures. It is the prime function of regulator 21 to control the rate of flow of air into and out of cabin 10, and its operation is of decided importance particularly when leakage of air occurs through the hull of the aircraft. In the performance of military missions, a sealed cabin 10 may be punctured by bullets so that an appreciable part of the air exhausts from the cabin through the bullet holes, rather than through conduit 12. Under these conditions, it will be apparent that in order to maintain pressure in cabin 10, the rate of flow of air into the cabin must be increased, and it is presumed that supercharger 14 and by-pass valve 19, under the control of regulator 57, will be able to maintain the cabin input pressure constant, although the rate of flow of air into cabin 10 may be increased over the normal rate of flow which exists when cabin 10 is completely sealed and exhausts air only through conduit 12.

Since the pressure in the throat 16 of venturi 15, under all the conditions of operation anticipated will be very low (for example, on the order of a few inches of mercury) as compared to the cabin pressure existing in chamber 33, to balance chambers 31 and 33 in the neutral position, it is necessary that chamber 31 be held extended by means of the coil spring 31' to prevent the superior pressure in chamber 33 from collapsing chamber 31. As the rate of flow of air into cabin 20 increases due, for example, to punctures in the cabin wall, the pressure at throat 16 decreases and valves 42 and 43 will be moved from their neutral position over ports 44 and 45 to the position shown in the figure, causing piston 47 to move to the right and either partially or completely closing the valve 23 so that the rate of exhaust through the cabin holes, either alone, or in conjunction with the exhaust through conduit 12, will not exceed the arbitrary limit of 80 ft. per minute per passenger. Of course, if the cabin is badly punctured, so that the rate of exhaust through the holes exceeds the arbitrary limit, above specified, valve 23 will remain completely closed and under these conditions, should the cabin pressure start to fall, regulator 57 will act to close valve 19, allowing more air to flow into cabin 10, and in the face of continued decrease of cabin pressure, regulator 57 will eventually operate to close valve 19 completely, and cabin pressure may be maintained unless the area of the bullet holes becomes so great that the exhaust therethrough is to high and causes the output pressure of supercharger 14 to fall, under which conditions the craft, if in too high an altitude for comfortable breathing, must descend to a lower altitude.

A commercial airliner will not be expected to encounter the extreme conditions imposed upon military aircraft, as above outlined, but quite possibly minor cabin leakages may always exist in the higher altitudes, and then, when the rate of flow increases through venturi 15, causing a drop in pressure at throat 16, and therefore in chamber 31, valve 23 will be operated toward its closed position, thus reducing the rate of exhaust through conduit 12, and causing the rate of flow into cabin 10, and therefore, the rate of flow through venturi 15, to decrease. Under these conditions valve 23 may be moved toward its open position upon establishment of the so-called neutral pressure relation between chambers 31 and 33.

If for any reason, such as a sudden loss of altitude, the rate of exhaust through conduit 12 is decreased (due to the necessity of the exhaust to work into a greater atmospheric pressure) then, the rate of flow in venturi 15 will decrease, causing pressure at throat 16, and therefore in chamber 31, to increase. This increase forces valves 42 and 43 to the right of ports 44 and 45, respectively, causing piston 47 to advance to the left, and thus open valve 23 and increase the rate of exhaust through conduit 12 until the input rate through venturi 15 is re-established, at which point the pressure in throat 16 and chamber 31 will have increased so that valves 42 and 43 are again in their neutral position, closing ports 44 and 45, respectively.

A centrifugal or other type of supercharger than the "Roots" type shown, may be substituted for supercharger 14 and in the event that a centrifugal type is used, the bypass 17 may be omitted, and throttle valve 19 can be placed directly in the intake of supercharger 14 or directly in the ram 13. Further, while tube 20 is shown as connecting at one end to the throat of a venturi, it is understood that it is within the scope of the present invention to substitute a pitot static tube for venturi 15 and lead the static pressure to chamber 31 through passage 20.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

What is claimed is:

1. A cabin supercharging system comprising a cabin, an air intake, a compressor between said intake and said cabin, an air by-pass and a venturi situated between said compressor and said cabin, a pressure regulator, a first pressure chamber in said regulator sealed at a predetermined pressure, a second pressure chamber open to cabin pressure and in constant communication therewith, a partition between said chambers movable upon a change of cabin pressure, a servo-motor operable upon movement of said partition to regulate the passage of air through said by-pass, a second pressure regulator having a chamber open to cabin pressure and a chamber open to Venturi pressure, a partition between said second named chambers movable upon a change of cabin or Venturi pressure, an exhaust passage connected to said cabin, a valve for throttling exhausted air in said passage, a servo-motor operable upon movement of said partition to vary the position of said throttling valve in said passage, and a second valve in said passage, responsive to atmospheric pressure to limit the rate of discharge of air through said passage, under conditions of varying atmospheric pressure.

2. A cabin supercharging system including an air inlet for said cabin, an exhaust member, means to increase the air pressure in said inlet over exterior atmospheric pressures, a valve in said exhaust member, means responsive to changes in rate of flow of air into said cabin to regulate the operation of said valve, pressure throttling means associated with said air inlet, a regulator responsive to variation from a predetermined cabin pressure for operating said throttling means, and a second valve in said exhaust member responsive to atmospheric pressures to limit the rate of air exhaust from said cabin.

3. A cabin supercharging system for aircraft cabins, including inlet and exhaust air passages, a supercharging member in said inlet passage, a throttling valve associated with each of said passages to vary the pressures therein in operation, a first regulator having a pressure chamber in communication with the aircraft cabin and a chamber sealed at a predetermined pressure, a servo-motor connected to the valve associated with said inlet passage and controlled by said first regulator to maintain a desired pressure in said inlet passage, a second regulator having a chamber in communication with the aircraft cabin, another chamber in communication with said inlet passage, a second servo-motor connected to the valve in said exhaust passage, said second regulator operating said second servo-motor upon a change in the pressure relation between the two chambers therein to vary the pressure of air discharged through said exhaust passage, and means responsive to varying atmospheric pressures to restrict the discharge rate to a predetermined maximum value.

4. A supercharging system for aircraft cabins, comprising an air intake, a compressor therein, an air throttling member associated with said air intake, a member sensitive to pressure changes within said intake, a pressure regulator, a first pressure chamber sealed at a predetermined pressure, a second pressure chamber open to cabin pressure, a partition between said chambers movable upon a change of cabin pressure, a servo-motor operable upon movement of said partition to regulate operation of the throttling member associated with said intake, a second pressure regulator having a chamber open to cabin pressure, a chamber connected to said pressure sensitive member and having a pressure governed by said pressure sensitive member, a partition between the last two of said chambers movable upon a change of cabin or intake pressure, an exhaust passage connected to the cabin, a valve for throttling exhausted air in said passage, and a second valve therein, responsive to atmospheric pressure to limit the rate of discharge of air through said passage under varying atmospheric conditions.

DAVID GREGG.